J. M. FITZ GERALD.
BATTERY WELL.
APPLICATION FILED SEPT. 27, 1913.

1,130,808.

Patented Mar. 9, 1915.
2 SHEETS—SHEET 1.

Witnesses:
T. K. Alfred
James E. Lyons

Inventor
John M. FitzGerald
by Brown & Phillips Attys

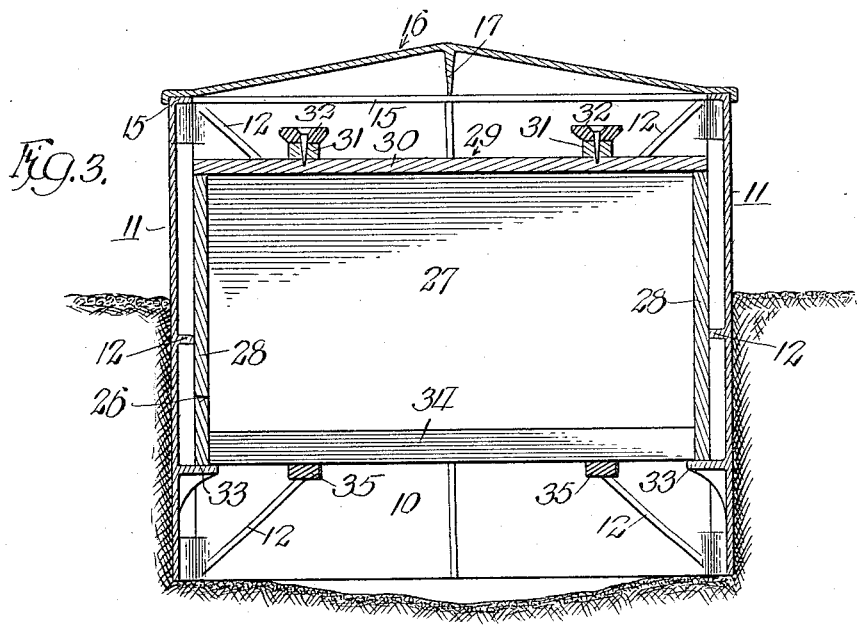
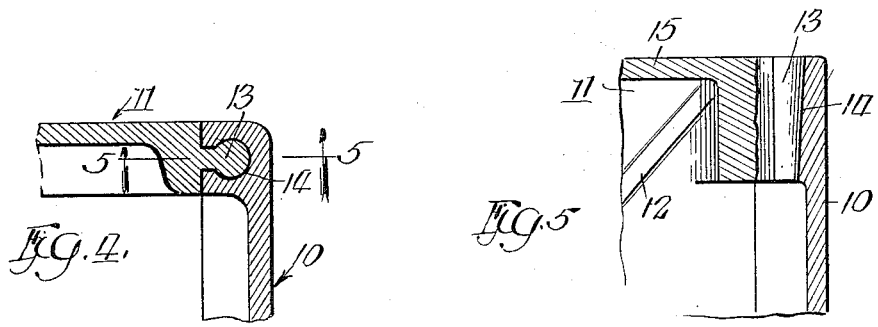
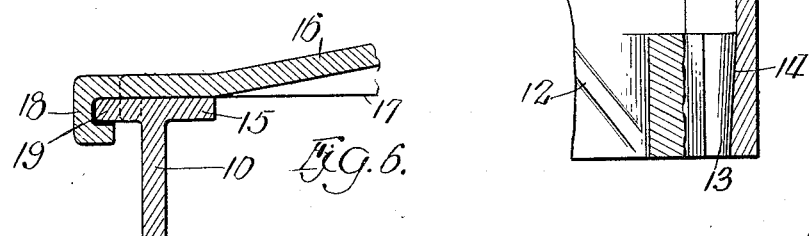

UNITED STATES PATENT OFFICE.

JOHN M. FITZ GERALD, OF CHICAGO, ILLINOIS, ASSIGNOR TO THE RAILROAD SUPPLY CO., OF CHICAGO, ILLINOIS, A CORPORATION OF CONNECTICUT.

BATTERY-WELL.

1,130,808.   Specification of Letters Patent.   Patented Mar. 9, 1915.

Application filed September 27, 1913. Serial No. 792,082.

*To all whom it may concern:*

Be it known that I, JOHN M. FITZ GERALD, a citizen of the United States, and a resident of Chicago, in the county of Cook and State of Illinois, have invented certain new and useful Improvements in Battery-Wells; and I do hereby declare that the following is a full, clear, and exact description thereof, reference being had to the accompanying drawings, and to the letters of reference marked thereon, which form a part of this specification.

This invention relates to improvements in battery wells and consists of the matters herein set forth and more particularly pointed out in the appended claims.

Battery wells are used in the storage of electric batteries required in the operation of block signal appliances and for other track circuits on railroads, and as heretofore constructed have been heavy and cumbersome, so as to require special railway apparatus for use in installing them. In addition, on account of their bulk and weight, the expense of transporting such battery wells from the place of manufacture to the place of installation is considerable.

The object of my invention is to provide a battery well which is not only cheap and economical of manufacture, but which may be shipped to the point of installation in knock-down form and may be there assembled and installed by unskilled labor.

The various advantages of my invention will appear as I proceed with my specification.

Figure 1:
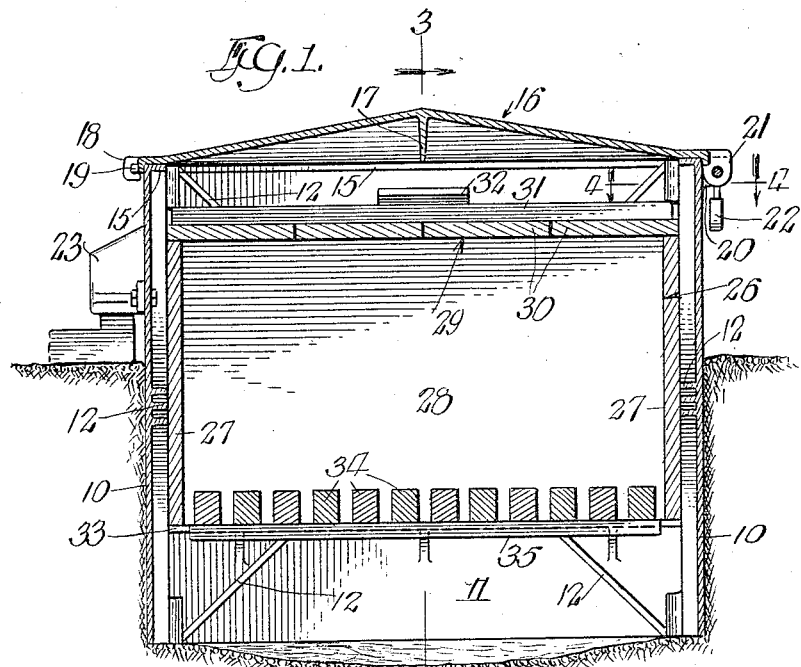
Figure 2:
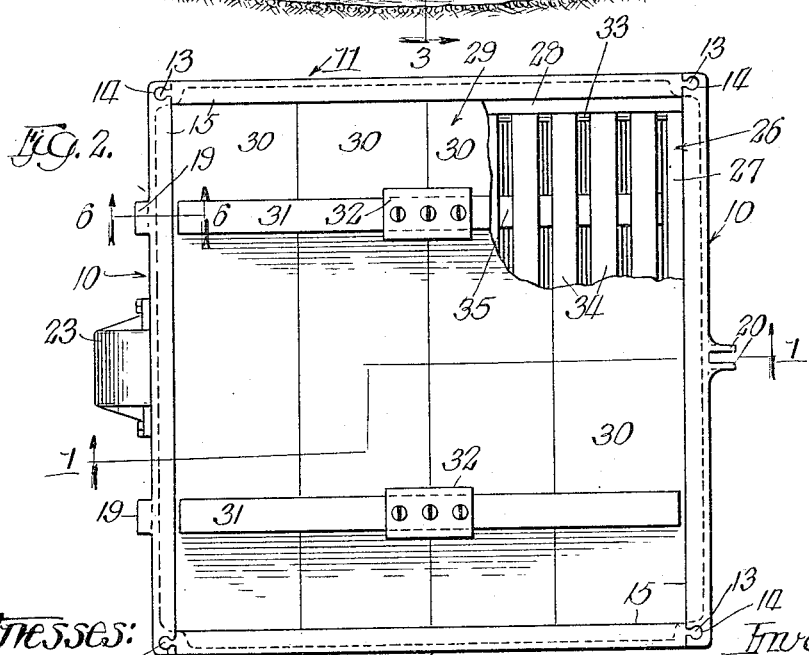

In the drawings: Figure 1 is a view representing a vertical section through my improved battery well, taken in a plane indicated by the line 1—1 of Fig. 2. Fig. 2 is a view representing a plan of the battery well, with the cover removed. Fig. 3 is a view representing a vertical section through the battery well in a plane indicated by the line 3—3 of Fig. 1. Fig. 4 is a detail sectional view on an enlarged scale, the plane of the section being indicated by the line 4—4 of Fig. 1. Fig. 5 is a detail sectional view, the plane of the section being indicated by the line 5—5 of Fig. 4. Fig. 6 is a detail sectional view, the plane of the section being indicated by the line 6—6 of Fig. 2.

Referring now to that embodiment of my invention shown in the drawings, 10, 10 and 11, 11 indicate the four upright side walls of the battery well, which walls may be made of any suitable material, such as metal, concrete or the like. Each of the walls is provided with diagonally extending strengthening ribs 12, which also act as spacing ribs to offset the outer vertical walls of a frost box, presently to be described, from the walls of the battery well so as to provide an air space or jacket between said walls.

Suitable means are provided for readily and conveniently locking the proximate vertical edges of the four upright walls of the battery well together to form a box, open top and bottom. As shown, the walls 11, 11 are provided at their ends, at or near the top and bottom, with vertical, elongated tongues 13 adapted for engagement in complementary elongated grooves 14, that are formed in the marginal parts of the walls 10 where they overlap the vertical edges of the walls 11. The tongues 13 are tapered downwardly and the grooves 14 tapered correspondingly, so that when the walls 11, 11 are slipped into place with the tongues 13 engaged in the grooves 14, a slight blow or pressure downward upon the upper edges of the walls 11, will cause said tongues and grooves to be tightly interlocked, making a corresponding blow or pressure from below necessary to disengage the walls from interlocking engagement.

All of the walls 10, 10, 11, 11 have horizontal flanges 15 at their upper edges to form a seat for a cover plate 16 which, as shown, is in one piece but may be made of separable sections for easy handling. Said cover plate is of flat, pyramidal shape and is provided with depending strengthening ribs 17 in a familiar manner. One edge of the lid has hook extensions 18 which are adapted for engagement with horizontal tongues 19, 19, formed at the top of one of the walls 10. The other wall 10 is provided with laterally spaced lugs 20, which are adapted to embrace a projecting lug 21 on the cover plate when the same is in closed position. All of said lugs are perforated to receive the clasp of a lock 22, which locks the cover in closed position on top of the battery well. One of the walls 10 has attached to it a trunking box 23 in a familiar manner.

26 indicates the frost box, which is supported within the battery well, and which contains the batteries to be located therein. Said box is preferably made of wood, and consists of upright side members 27, 27 and 28, 28 and of a lid 29 which closes the top of the box. Said lid 29 is made of boards 30, attached together by means of transversely extending parallel bars 31, 31. 32, 32 indicate blocks attached to said bars, at or near the middle to provide handles for lifting the cover. The side members 27, 28 are of such dimensions that they form a box of cross section capable of fitting within the vertical air spaces defined by the strengthening ribs 12 of the battery walls. The battery walls 11, 11 have horizontal flanges 33, located above the bottom of the battery well. Said flanges act to support the frost box and are made wide enough to project inwardly beyond said walls so as to act as a support for a plurality of parallel, closely spaced floor beams 34. The floor beams 34 are attached together and held in proper spaced relation by means of transverse parallel bars 35, 35, so that the floor beams may be put into position as a single structure. The batteries are supported on the floor beams 34. The frost box supporting flanges are so located as to leave a considerable air space below the frost box and the height of the frost box is so proportioned with reference to the height of the battery well that a similar space is left between the cover of the frost box and the cover of the battery well.

The battery well is located in an excavation in the ground in the usual manner. It is shipped to the point of installation in knock-down form, and after the excavation is made at the point at which it is to be installed, the side walls 10, 10 and 11, 11 of the well are dropped into place and attached together at their vertical edges as heretofore described. The upright walls 27, 27, and 28, 28 of the frost box are then inserted through the open top of the battery well and brought to bear at their lower edges on the horizontal flanges 33, 33 with their outer surface in engagement with the strengthening and spacing ribs 12 of the battery well. The walls of the battery well thus hold the walls of the frost box in position from the outside. The floor beams 34, attached together by the transverse bars 35, are then inserted through the open top of the frost box and their ends brought to bear on the parts of the flanges 33, 33, which extend inwardly beyond the walls 27, 27 of the frost box. Said ends also engage against the inner marginal bottom surfaces of the two oppositely disposed walls 28, 28 of the frost box and brace said walls from the inside so as to assist in maintaining them in a vertical position. The other oppositely disposed walls 27, 27 of the frost box are held in vertical position between the upright edges of the walls 28, 28 and the adjacent side walls 10, 10 of the battery well. The battery well is now in condition for the installation of the batteries and after the batteries are installed, the cover 29 is placed on top of the frost box, and the cover 16 locked in place to close the battery well.

From the construction described, it is apparent that the frost box is entirely inclosed by an air jacket, which insulates it so as to prevent it from being subjected to the changes of temperature in the atmosphere and ground surrounding the battery well. It will also be noted that the battery well, being open at the bottom, the floor beams of the frost box and the batteries supported thereby, are exposed to the temperature of the ground below the battery well. As this temperature is always warmer in cold weather than the outside air, the batteries, instead of being exposed to the cold atmosphere that may be inclosed in the frost box when the batteries are installed, are subjected, after the battery well is closed, to the warmer atmosphere within the frost box, due to the result of the warm atmosphere rising from the ground thereunder.

While in describing my invention, I have referred to certain details of mechanical construction and arrangement, it is to be understood that the invention is in no way limited thereby except as pointed out in the appended claims.

I claim as my invention:

1. A knock-down battery well, comprising side walls, means for detachably locking said walls together at their vertical edges to form a box which is open top and bottom, said walls being provided with means on their inner surfaces defining an air jacket spaced within the box, two opposite walls of the box being provided with means forming supports located above the bottom of said box, and a knock-down frost box adapted to rest upon said supports within the said defined air jacket space.

2. A knock-down battery well, comprising side walls, means for detachably locking said side walls together at their vertical edges to form a box open top and bottom, said walls being provided with spacing ribs to define an air jacket within the box, and two of the opposite walls being provided with flanges located above the bottom of said box, and a knock-down frost box adapted to be supported on said flanges and to be contained in the jacket space defined by said spacing ribs.

3. A knock-down battery well, comprising side walls, means for detachably locking said side walls together at their vertical edges to form a box open top and bottom, said walls being provided with spacing ribs to define an air jacket within the box, and two of the opposite walls being provided with flanges located above the bottom of said box, and a knock-down frost box comprising side walls adapted to be assembled together within the battery, and when thus assembled to form a box, open top and bottom, resting upon said flanges and contained within the jacket space defined by said spacing ribs, a floor comprising a plurality of parallel floor beams and transverse members attaching said floor beams together and a removable cover for said frost box, in combination with a separable cover for said battery well, and means for locking the same in position.

In testimony, that I claim the foregoing as my invention I affix my signature in the presence of two witnesses, this 25th day of September A. D. 1913.

JOHN M. FITZ GERALD.

Witnesses:
T. H. ALFREDS,
GAIL W. DALL.